(12) United States Patent
Rodriguez (10) Patent No.: US 10,691,986 B2
(45) Date of Patent: Jun. 23, 2020

(54) CLONING A COMPUTING ENVIRONMENT

(71) Applicant: International Business Machines Corporation, Armonk, NY (US)

(72) Inventor: Jean-Michel Rodriguez, Mauguio (FR)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/903,232

(22) Filed: Feb. 23, 2018

(65) Prior Publication Data

US 2019/0266453 A1 Aug. 29, 2019

(51) Int. Cl.
*G06K 9/78* (2006.01)
*G06K 9/46* (2006.01)
*G06F 16/28* (2019.01)

(52) U.S. Cl.
CPC ............ *G06K 9/78* (2013.01); *G06F 16/285* (2019.01); *G06K 9/4638* (2013.01)

(58) Field of Classification Search
CPC ....... G06K 9/78; G06K 9/4638; G06F 16/285
See application file for complete search history.

(56) References Cited

U.S. PATENT DOCUMENTS

| | | | | |
|---|---|---|---|---|
| 6,188,973 B1 * | 2/2001 | Martinez | ................ | G06Q 10/06 702/188 |
| 6,957,186 B1 * | 10/2005 | Guheen | .................. | G06Q 99/00 705/323 |
| 6,988,136 B2 * | 1/2006 | Sicola | .................. | G06F 3/0601 709/224 |
| 7,142,416 B2 * | 11/2006 | Subbarao | .................. | G06F 1/16 361/679.25 |
| 7,356,679 B1 * | 4/2008 | Le | ........................ | G06F 9/45558 713/1 |
| 8,218,322 B2 | 7/2012 | Clidaras et al. | | |
| 8,315,977 B2 | 11/2012 | Anand et al. | | |
| 9,495,273 B2 * | 11/2016 | Eischeid | ............. | G06F 11/3006 |
| 9,591,606 B1 * | 3/2017 | Shetty | .................... | G01S 5/0284 |
| 10,152,479 B1 * | 12/2018 | Granstrom | ............ | G06F 16/483 |

(Continued)

FOREIGN PATENT DOCUMENTS

IN 1610MUM2011 A 12/2012

OTHER PUBLICATIONS

Cooper, Cloning Data Centers Cuts Costs, EDS, Copyright © 2014 Environmental Systems Design, printed, Aug. 28, 2017, 2 pages. http://www.esdglobal.com/news/article/1059-cloning-data-centers-cuts-costs.

(Continued)

*Primary Examiner* — Mekonen T Bekele
*Assistant Examiner* — Molly Delaney
(74) *Attorney, Agent, or Firm* — Daniel C. Housley (57) ABSTRACT

A computer implemented method comprises receiving one or more images of a computing environment comprising a plurality of interconnected components, analyzing the or each received image to identify each component shown in the image(s) and the connection(s) of each identified component, by identifying a set of attributes for each component from the image(s) and matching the identified attributes to attributes of known components stored in a database, obtaining a specification for each identified component, and generating a document comprising each identified component, its respective specification and the connection(s) of each identified component.

20 Claims, 7 Drawing Sheets

(56) References Cited

U.S. PATENT DOCUMENTS

| | | | | |
|---|---|---|---|---|
| 2005/0027831 | A1* | 2/2005 | Anderson | G06F 8/63 |
| | | | | 709/220 |
| 2008/0215844 | A1* | 9/2008 | Thomas | G06F 9/4413 |
| | | | | 711/170 |
| 2011/0210167 | A1* | 9/2011 | Lyon | G06F 13/4095 |
| | | | | 235/375 |
| 2011/0258302 | A1* | 10/2011 | Cole | G06F 11/006 |
| | | | | 709/223 |
| 2012/0005344 | A1* | 1/2012 | Kolin | H05K 7/20836 |
| | | | | 709/226 |
| 2013/0246673 | A1* | 9/2013 | Cox | H04L 41/0806 |
| | | | | 710/104 |
| 2016/0011900 | A1* | 1/2016 | Reddy | H04L 67/38 |
| | | | | 718/1 |
| 2016/0105317 | A1* | 4/2016 | Zimmermann | H04L 41/0893 |
| | | | | 709/221 |
| 2017/0149931 | A1* | 5/2017 | Lochhead | H04L 47/70 |

OTHER PUBLICATIONS

Aziz et al., "Logical Datacenter Replication", Disaster Recovery Journal, Nov. 22, 2007, Abstract Only, 3 pages. https://www.drj.com/journal/winter-2003-volume-16-issue-1/logical-datacenter-replication.html.

"Multi-Datacenter Replication", Copyright © Confluent, Inc. 2014-2018, 2 pages, printed Aug. 30, 2017. https://www.confluent.io/product/multi-datacenter/.

* cited by examiner

CLONING A COMPUTING ENVIRONMENT

BACKGROUND

The present invention relates to a method, system and computer program product for cloning a computing environment comprising a plurality of interconnected components.

Each computing environment (e.g., server, desktop computer, etc.) has a particular set of components that are interconnected with a specific set of cables/connections, and each component occupies a particular location. Interconnectivity and compatibility across brands and models of components allow for a large number of combinations of computing components and equipment.

SUMMARY

According to a first aspect of the present invention, there is provided a computer implemented method comprising receiving one or more images of a computing environment comprising a plurality of interconnected components, analyzing each received image to identify each component shown in the image(s) and the connection(s) of each identified component, by identifying a set of attributes for each component from the image(s) and matching the identified attributes to attributes of known components stored in a database, obtaining a specification for each identified component, and generating a document comprising each identified component, its respective specification and the connection(s) of each identified component.

According to a second aspect of the present invention, there is provided a data processing system comprising a processor arranged to receive one or more images of a computing environment comprising a plurality of interconnected components, the processor being communicatively coupled to a memory with program instructions thereon, the program instructions configured to cause the processor to execute a method, the method comprising: analyzing each received image to identify each component shown in the image(s) and the connection(s) of each identified component by identifying a set of attributes for each component from the image(s) and matching the identified attributes to attributes of known components stored in a database, obtaining a specification for each identified component, and generating a document comprising each identified component, its respective specification, and the connection(s) of each identified component.

According to a third aspect of the present invention, there is provided a computer program product for controlling a data processing system comprising a processor, the computer program product comprising a computer readable storage medium having program instructions embodied therewith, the program instructions executable by the processor to cause the processor to receive one or more images of a computing environment comprising a plurality of interconnected components, analyze each received image to identify each component shown in the image(s) and the connection(s) of each identified component, by identifying a set of attributes for each component from the image(s) and matching the identified attributes to attributes of known components stored in a database, obtain a specification for each identified component, and generate a document comprising each identified component, its respective specification and the connection(s) of each identified component.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
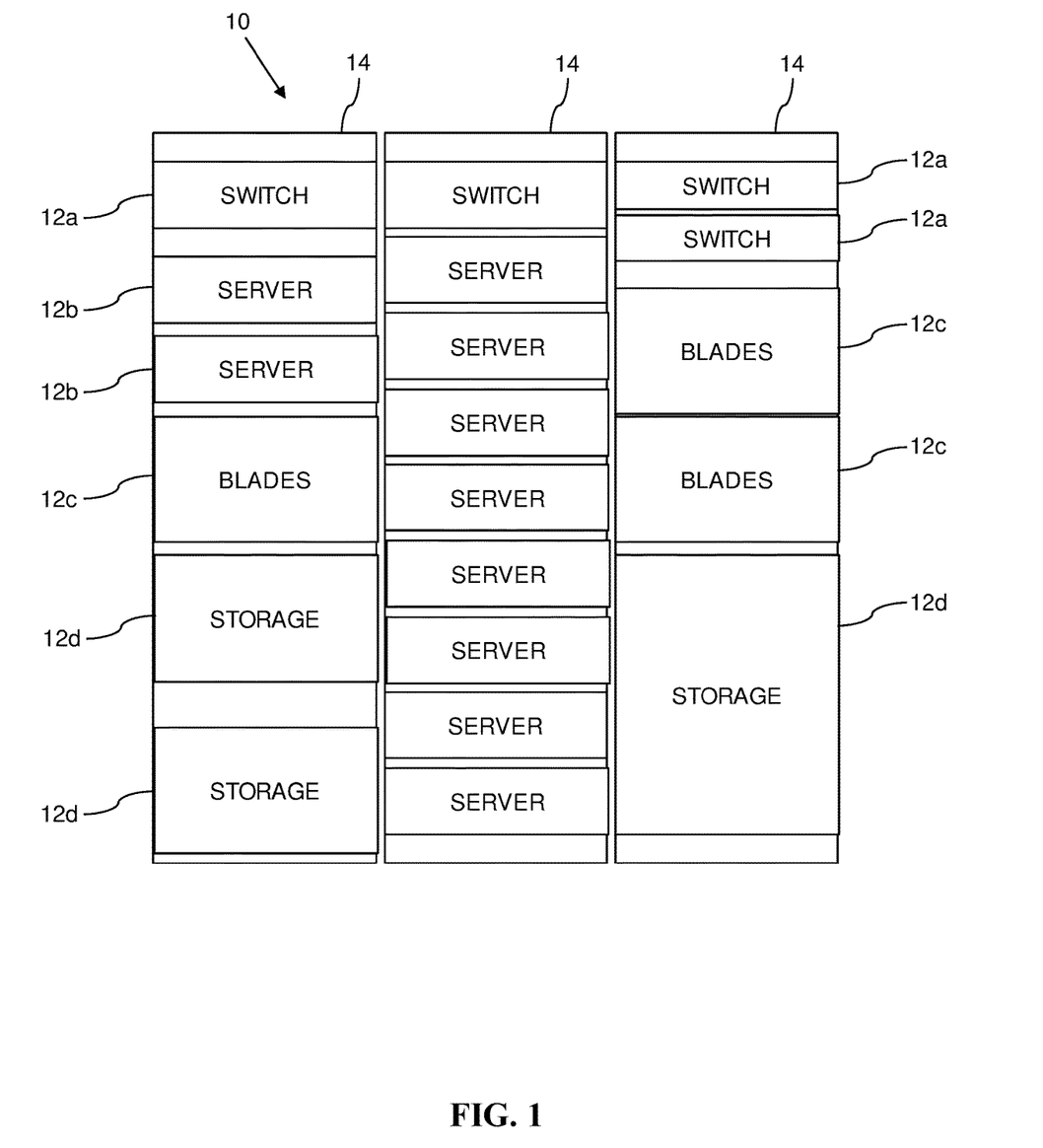
FIG. 1 is a schematic diagram of a computing environment, according to embodiments.

FIG. 1 shows a computing environment 10 comprising a plurality of interconnected components 12a-12d. The different hardware components 12a-12d may form a "POD," which, in the present embodiment, comprises three cabinets or racks 14 in which the components 12a-12d may be located. In this embodiment, a front view of the components 12a-12d is shown. At the rear of the components 12a-12d, various connections may be made, between/among the components 12a-12d and from the components 12a-12d to external devices/systems. The different components 12a-12d may provide various computing functions such as processing, storage, networking, etc. In this embodiment, the components 12a are switches, the components 12b are servers, the components 12c are blades, and the components 12d are storage devices.

As can be seen in FIG. 1, different components 12a-12d may be different sizes. In general, a rack 14 will be sized in "units of rack" such as U40, with individual components 12a-12d taking up one or more U within the rack 14. The physical location of the components 12a-12d and the connections made between components 12a-12d is important for a number of factors, such as efficiency of connection and the stability of the rack 14 (with heavier components 12a-12d tending to be located towards the bottom of a rack 14). In general, the connections between the components 12a-12d are made at the rear of the racks 14 and include, for example, power and data connections.

The computing environment 10 shown in FIG. 1 is an example of a data center (or of part of a larger data center) which has one or more specific computing functions, such as managing the computing operations of a local business site, or managing a website of a business that has web services and supports transactions and the like. Cloning the computing environment 10 may be required, for example, in order to replicate the function(s) of the hardware components 12a-12d that make up the environment 10, or to provide a backup. This can be performed from the logical perspective of the software and services being operated by the environment 10, or can be performed from the hardware perspective.

Figure 2:
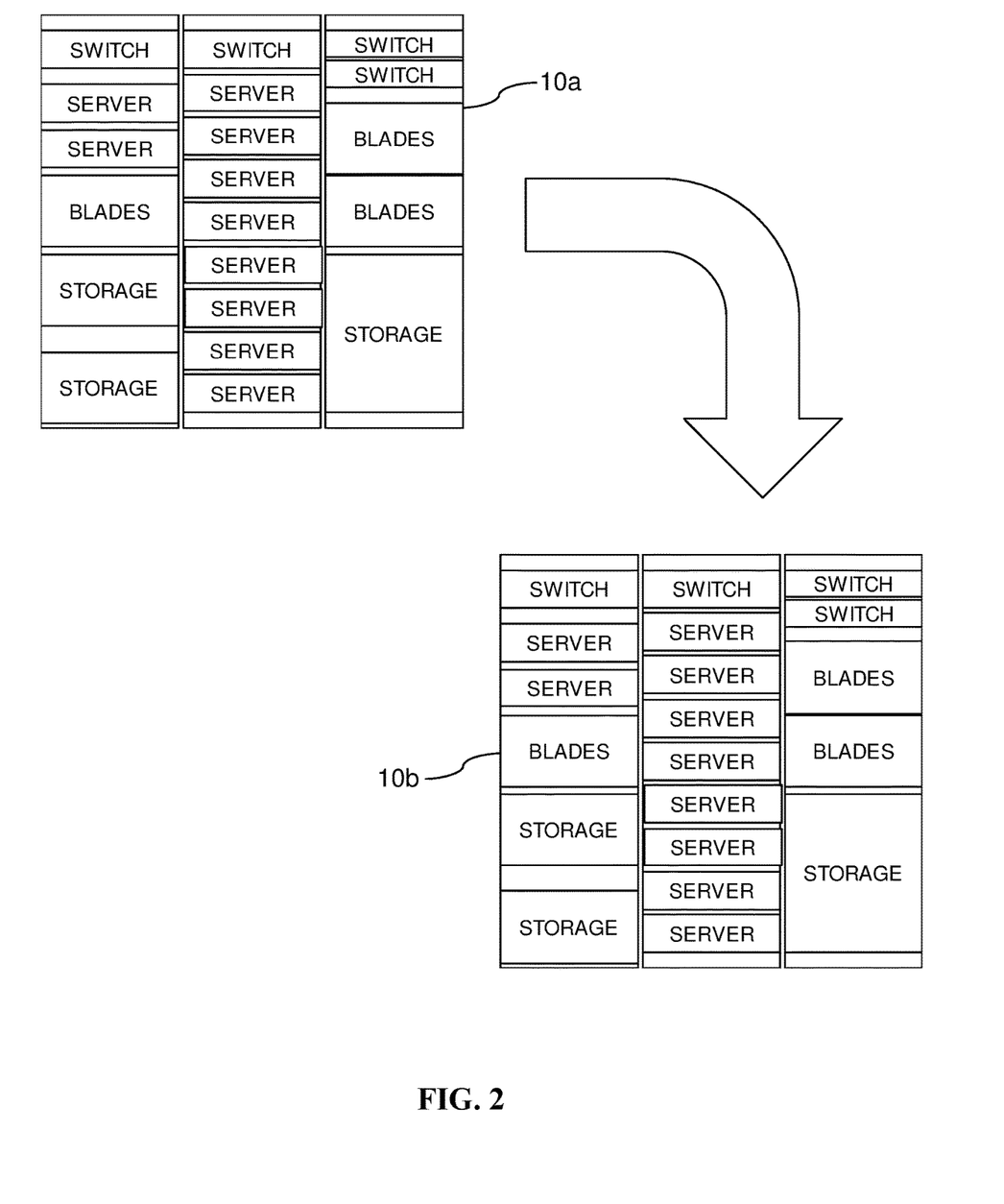
FIG. 2 is a schematic diagram of a cloning operation, according to embodiments.

FIG. 2 illustrates, schematically, the action of cloning the computing environment 10 from a source configuration 10a to a target configuration 10b. This process of cloning the hardware may be automated and may be based upon one or more images of the original computing environment 10a which are captured, either automatically or manually by an administrator. The images may be still images or may be video images. The cloning process can be carried out using a single image but in a preferred working system, at least two images will be created and used, a first image showing the front of the components (e.g., components 12a-12d of FIG. 1) within the computing environment 10 and a second image showing the rear of the components and the connections between the components.

The purpose of the automatic cloning process is to start with one or more images of the original computing environment 10a and finish by generating a document that, as a minimum, includes each identified component, its respective specification, and the connection(s) of each identified component. Other additional useful information can be contained within the document, such as the physical location of components within the racks (e.g., racks 14 of FIG. 1), which may make the generation of an exact replica of the original computing environment 10a much easier. The document can then be provided to the target location as a way of facilitating the cloning process of creating the new computing environment.

An advantage of the automating cloning process is that the process removes the requirement for an administrator to be present at both locations at least once. The process also removes the requirement of an administrator at the source environment 10a themselves having to identify the components and the connections between them. Once the images of the computing environment 10 are captured, then the automatic cloning process will work from these images to identify the components shown in the images and to identify the connections between the different components. The cloning process makes it easy for a physical environment to be cloned without the need to use specially trained administrators.

The cloning process may comprise receiving one or more images of a computing environment 10a comprising a plurality of interconnected components, analyzing each received image to identify each component shown in the image(s) and the connection(s) of each identified component, obtaining a specification for each identified component, and generating a document comprising each identified component including its respective specification and the connection(s) of each identified component. This process may take, as its source, the image(s) of the environment 10a and, as its output, may produce a document that can be used to perform the cloning of the computing environment 10a. The document contains the information necessary to perform the cloning operation. For example, the document may contain a list of components, as well as a set of step-by-step instructions for how to insert the components into a rack and connect the power and data cables.

Figure 3:
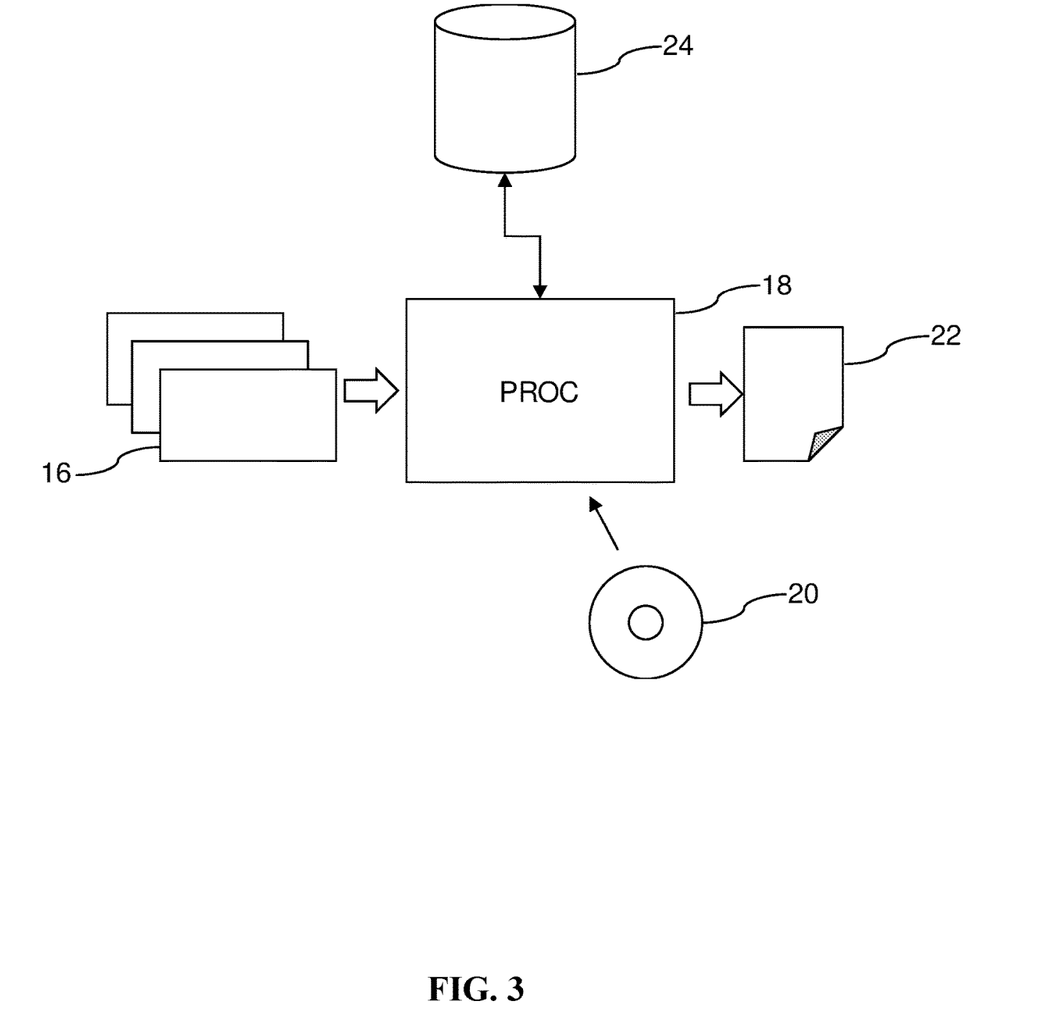
FIG. 3 is a schematic diagram of a cloning process, according to embodiments.

FIG. 3 illustrates the POD cloning process, from a global viewpoint. The input for the process may be the image(s) 16, which may be received by a processor 18, which may be part of a data processing system, such as a desktop computer, server, etc. The processor 18 may be controlled by a computer program product that is stored on a computer readable medium 20. The computer readable storage medium 20 may have program instructions embodied therewith, the program instructions executable by the processor 18 to cause the processor 18 to generate a document 22. The processor 18 may be connected to a database 24. The database 24 may be a database of computing components and may comprise a set of computing components (e.g., components 12a-12d of FIG. 1) and their respective specifications. The processor 18 may use the information within the database 24 in the construction of the document 22.

The processor 18 may operate through various phases in the process of generating the document 22 from the image(s) 16. These phases may be automated to ensure that the final output is not prone to any human error, and it ensures a consistent and auditable process for creating a clone of the physical environment that comprises the racks and computing components. The document 22 can also include building instructions for replicating the computing environment, in addition to the actual information about the nature of the computing environment's components and their connections. The building instructions can then be used at another location to clone the computing environment. The cloning can be performed any number of times.

Phase one of the process may comprise taking one or more photos of the source environment (e.g., environment 10a of FIG. 2), which can be done locally, remotely or automatically, using a static or dynamic camera. Firstly, it is determined if a rack (such as a 44U standard rack) or a single unit (for example a DS8000 storage unit) is shown. If a rack is shown, then front end and back end photos of the rack(s) present in the environment may be taken. In this preferred embodiment of the process, two photos may be necessary. The first photo may show the front-end of the rack with the door opened, as this will help to understand and identify the equipment installed (capturing information such as logo, numbers, images, size, apparent options like HDs, CDs, adaptors, connectors and so on), their position in the rack and the cabling.

The second photo may show the back-end of the rack, again with the door opened, again since this will help to understand and identify the equipment installed (capturing information such as logo, numbers, images, size, apparent options like HDs, CDs, adaptors, connectors), their position in the rack, and the cabling. If multiple racks are present in the computing environment, then two photos of each rack may need to be acquired, and each rack may be photographed front and back with the doors opened, so that the components within the rack can be seen as clearly as possible.

Figure 4:
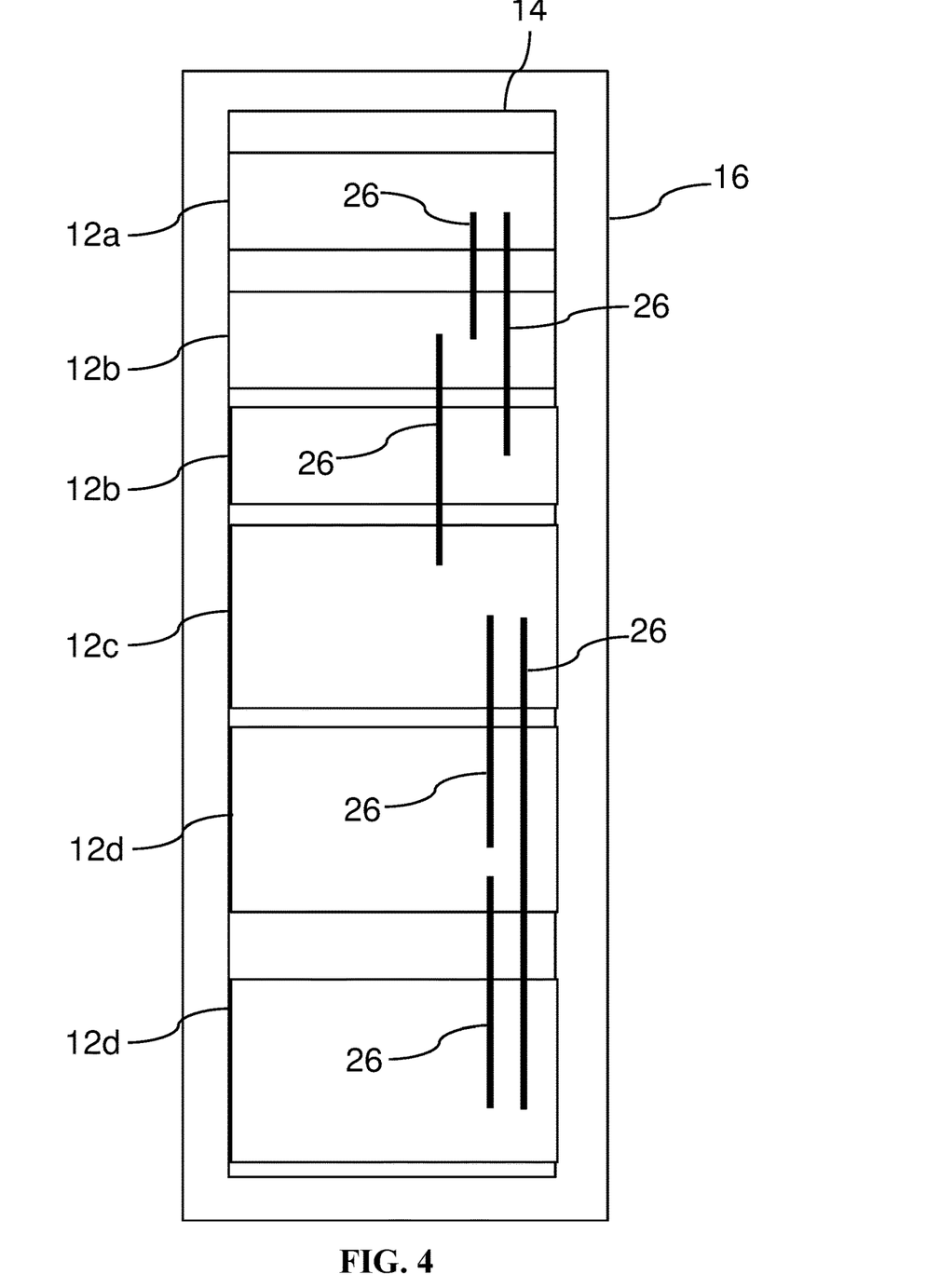
FIG. 4 is a schematic diagram of a rack of computer components, according to embodiments.

FIG. 4 shows, schematically, a rear image 16, which may be, for example, a rear view of the left-most rack 14 shown in FIG. 1. There may be six individual components 12a-12d in this rack 14, from top to bottom: a switch 12a, two servers 12b, blades 12c, and two storage devices 12d. The rear image 16 may show the connections among components 12a-12d. Individual cables 26 may connect together different components 12a-12d and also provide external connections and power supply connections. The rear image 16 may be captured in color, as information relevant to the construction of the final document may be obtained from the color of components 12a-12d, or from the color of the cables 26 that are connecting the components 12a-12d.

Figure 5A:
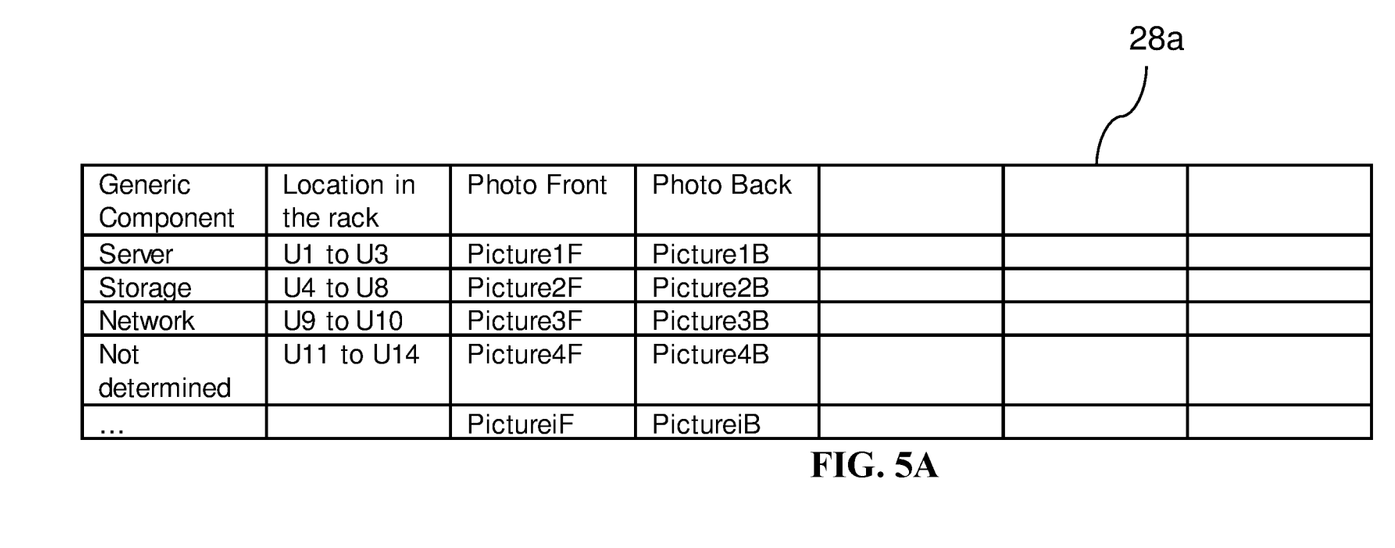
FIG. 5A is a table of computer components, according to embodiments.

Phase two may begin with a cognitive analysis of the source computing environment (e.g., computing environment 10a of FIG. 2), where each photo taken in phase one may be analyzed to identify the components installed, their positions, the space taken, and how the components are interconnected, if at all. A rack may comprise one or more servers, storage units, network boxes, etc. For one POD comprising one or more racks, the process may analyze both front and rear images of the racks and will determine how many components are present, their respective size (how many U may be used), and their location within the rack. A table may be generated (e.g., with a label of POD-RACK- Date, where the date is the date of creation of the table) and identify the various components. The image(s) may be parsed to isolate each component in the image, and the parsed photo may be inserted into the table. FIG. 5A illustrates an example table 28a. In embodiments, a table of components, along with the images of the computing environment, may be provided to an administrator for quality assurance purposes. An administrator may provide feedback regarding the accuracy of the table, and the feedback may be used to further increase the accuracy of the image analysis and component identification processes.

The identification of the components in the image(s) may be carried out using visual attributes derived from the image(s), logical attributes from probes and other sensors, management system data, etc. Visual attributes may include the color of a component or connecting cable; the size of the component (in U); features of the component visible in the image, such as drives, adapters, connectors, logos, and model numbers; cabling; and power connections. Logical attributes that can be derived from other probes and sensors may include temperature, weight, and load of a component. Logical attributes from a management system may include component type, model, and specification details. Each component may have a set of attributes that are identified from the image(s) and any other data sources, and these attributes may be cross-referenced against known components, whose attributes and specifications may be stored in a database (e.g., database 24 of FIG. 3). If there is a match of attributes, then a component may be identified; however, if there is not a close enough match of attributes for a component, then a message can be sent to a relevant administrator, and a new component with new attributes can be added to the database, manually. In embodiments, a new specification of the new component may be automatically created (or a partial specification, in the event that some attributes of the new component are unidentifiable) and presented to the administrator for confirmation and/or completion. In embodiments, data may be gathered from component manufacturers' websites (e.g., using crawlers or other data-scraping devices/programs) on an on-going basis to enable the automatic or on-the-fly updating of the database with newly-emerging components and their attributes and specifications.

Referring again to FIG. 5A, table 28a has the first four columns populated. Column 1 may include the name given to the generic component(s), column 2 may include the location in the rack of the component, column 3 may include the front image of the component, and column 4 may include the extract of the rear image of the component. At this point in the process (e.g., upon an initial image analysis for the identification/determination of component specifications), only these four columns may have been populated.

Figure 5B:
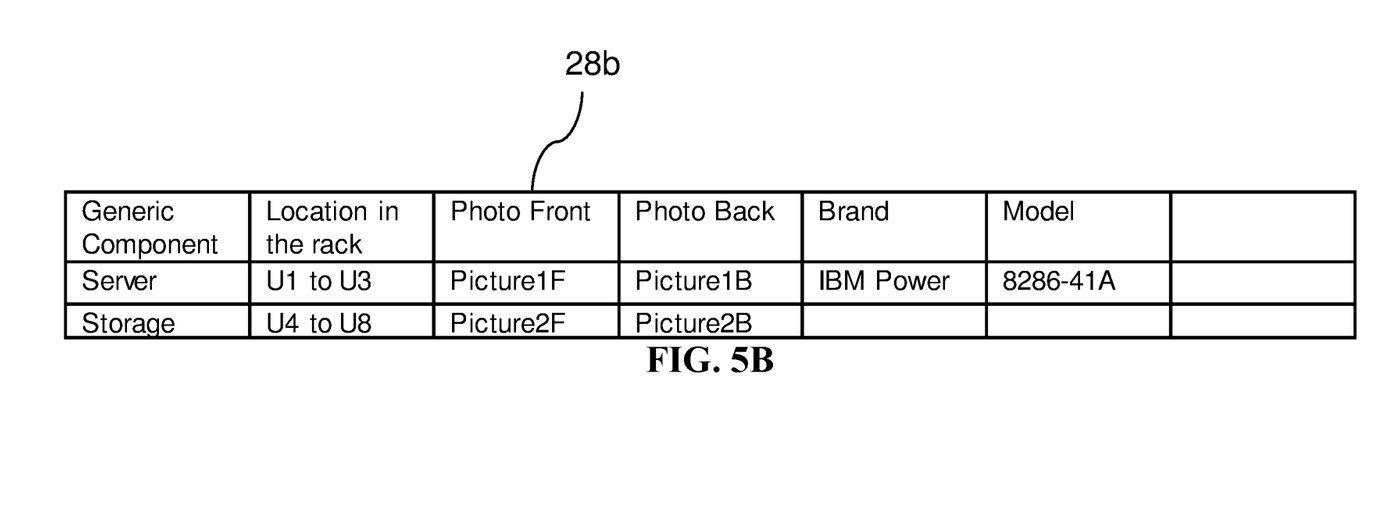
FIG. 5B is a table of computer components, according to embodiments.

Phase 2 may continue by determining each of the components' specifications. For each component, the two respective photos (e.g., front and rear images) may be analyzed and compared with the data in an existing components database (e.g., database 24 of FIG. 3), or they may be compared to an appropriate catalogue or database online or via an intranet. For example, a component's logo (e.g., gathered from the front image) and specifications (e.g., gathered from the rear image) may be used to determine the model number and specifications of the component (in embodiments, a configuration management database (CMDB) may be employed to find company standard specs of the component). In embodiments, phase 2 may then update table 28a. For example, FIG. 5B illustrates an updated table 28b (e.g., with two new columns being populated with component brand and component model number). Each row in the table 28b may be updated accordingly.

The next phase may comprise generating a building guide, (e.g., document 22 of FIG. 3) in order to provide operators with the instructions to order, manage, and install the components in the target environment (e.g., computing environment 10b of FIG. 2). For example, table 28b of FIG. 5B may be used to build a map of a source environment's POD that includes all of the racks and uses an existing component's user guide to explain how to insert the components in the new rack(s) and how to cable the components together in order to build a target environment POD that is a clone of the source environment POD.

A further optional phase can be provided in which a camera or other video mechanism can be used to capture further images of the cloned environment (e.g., a built target environment) and compare them to the source environment's specifications, in order to determine whether the cloned environment was built correctly. In embodiments, deviations from the source environment may be displayed to an administrator user, along with a suggestion of how to correct the discrepancy.

A further optional phase may apply image processing techniques to identify the power and data connections, and determine whether a more optimal connection may be possible. For example, a component may have a power connection to a power source that is not the closest power source. In order to avoid cable clutter and maximize the open space adjacent to the component(s) (and thereby increase airflow and decrease ambient temperatures), the method may provide one or more suggestions regarding cable/connection route and length that optimizes a computing environment's connections. In embodiments, suggestions may be provided on a connection-by-connection basis. In yet other embodiments, suggestions may be provided by aggregating all connections and providing an all-inclusive map of a computing environments connections, and selecting the shortest average connection length for all connections, combined.

A further optional phase may provide suggestions regarding space and temperature management. For example, when a particular computing environment has an excess of space or requires strict temperature management, it may provide operational benefits to space out components within a rack, for temperature and cooling purposes. In embodiments, a further optional phase may automatically provide component-spacing suggestions that maximize airflow and/or the space between components of a rack, and/or the space among components of an entire set of racks. Alternatively, when the space within a computing environment is at a premium and temperature management is less important, the optional method may provide a suggestion regarding the most compact and space-efficient order that components may be loaded into racks. Additionally, when a particular component has a comparable counterpart (e.g., another component with identical or substantially similar performance ratings) that is more compact (e.g., takes up less volume), a suggestion may be provided to replace the particular component with the comparable counterpart, in order to save space within the rack.

In yet a further optional phase, the operating frequencies of wirelessly-connected devices may be recorded and compared (e.g., using a wireless frequency monitor, or by recording the actual frequencies used by each component) to determine the amount of interference that may be encountered in the computing environment. Suggestions may be provided to minimize the amount of interference in the computing environment (e.g., a suggestion that a particular component switch to a different frequency/channel that is less similar to the frequency/channel used by another component).

Figure 6:
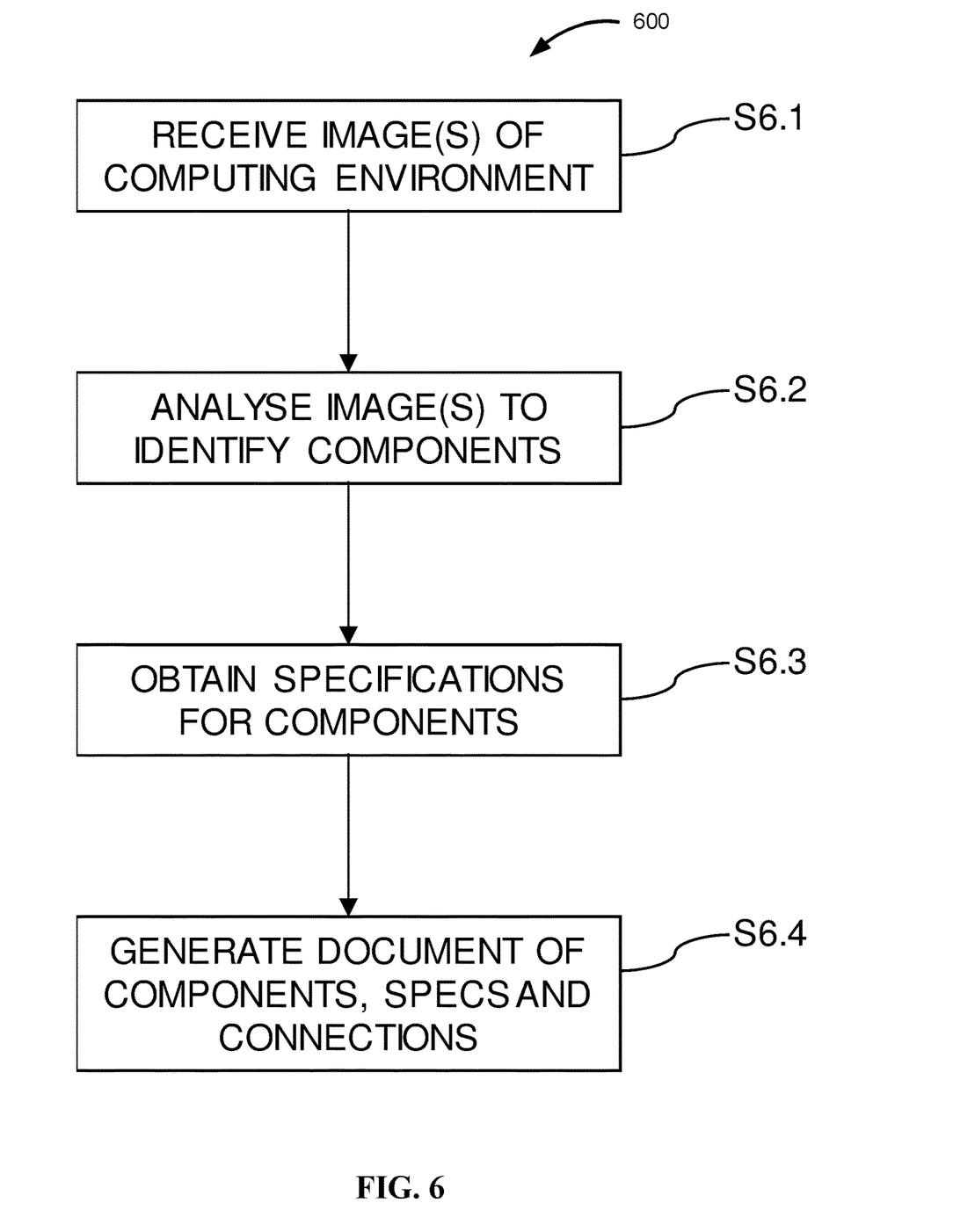
FIG. 6 is a flowchart of a method of operating the cloning process, according to embodiments.

FIG. 6 shows a flowchart of the computer implemented method of cloning a computing environment (such as, for example, environment 10a of FIG. 2). At S6.1, one or more images of a computing environment may be received. The one or more images may show a plurality of the interconnected components included in the computing environment. The image(s) may be captured by a human operator, or an automated camera can be used. The images may be still images, or they may include frames of a video file or data feed.

At S6.2, the image(s) may be analysed to identify the components depicted in the image(s), the connections between and/or among components, and a set of attributes for each component. The set of attributes for each component may be determined, as described herein, by comparing/matching the component's features/attributes to the features/attributes of known components stored in a database. As described herein, this can be a two stage process, where first each component may be identified generically (e.g., a storage unit), and then within the generic component type, the specific component may be identified (e.g., the brand/model of the storage unit may be identified).

At S6.3, a specification for each identified component may be obtained. The step of obtaining a specification for each identified component may comprise accessing a database of computing components and their respective specifications. S6.3 may also include accessing external information, for example, by accessing documents/data through the Internet, such as a manufacturer's website, in order to obtain specific details of a component. The database can also be populated manually and can be updated continually. For example, if a component cannot be identified, or its specifications cannot be determined, an administrator may manually enter the appropriate information into the database. In embodiments, a partial specification, based on what information was gathered from the image(s), may be supplied to the administrator for completion/confirmation.

At S6.4, document(s) describing, for example, the components, the components' specifications and connections, etc. may be generated in order to facilitate the cloning of the source computing environment. As a minimum, the document may identify each component and its specification (which could simply be the make and model of the component, or could be a more detailed specification) and the connections between the components. However, other information could also be included in the document, such as the relative positions of the components and size and arrangement of the racks in which the components are located, all of which can be used in the cloning of the original computing environment.

In embodiments, an exact clone may not be feasible. For example, a particular component may not be available at the physical location where the target/clone environment is to be assembled. Or, in another example, a different rack size may require the incorporation of components that are not identical to the source environment (e.g., to account for the different rack dimensions). In such situations, the database may include cross-references among components with identical, or comparable, performance ratings (e.g., processing power, data throughput, memory cache, temperature tolerance, etc.). This may allow for similar, but not identical, components to be substituted when a particular component cannot be located (e.g., is out of stock or unavailable), cannot be used (e.g., has a physical dimension that is incompatible with the available rack size(s)), etc.

The document of S6.4 may further include building instructions for replicating the source computing environment. In addition to the actual list of components, their connections, and the component specifications, the document can also include specific step-by-step instructions on how to build the computing environment, include specifying the relative position of the components, and include the order in which the components should be loaded into the rack(s) to create the cloned computing environment.

Figure 7:
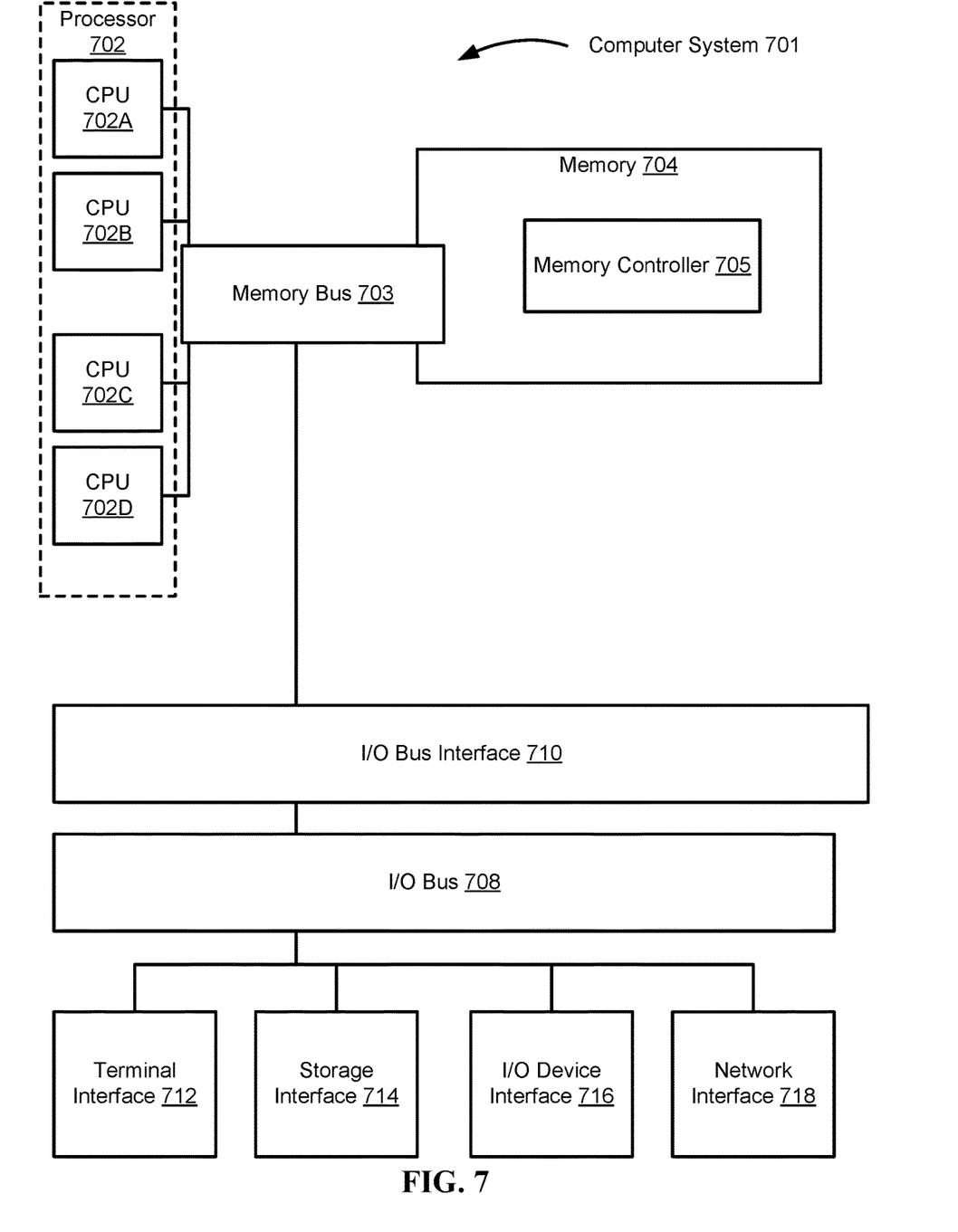
FIG. 7 illustrates a high-level block diagram of an example computer system that may be used in implementing embodiments of the present disclosure.

Referring now to FIG. 7, shown is a high-level block diagram of an example computer system (e.g., computer) 701 that may be configured to perform various aspects of the present disclosure, including, for example, method 600, described in FIG. 6. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating a computer environment cloning document, the method comprising:
   receiving one or more images of a computing environment, the one or more color images depicting a plurality of interconnected components;
   analyzing the one or more color images to identify each component of the plurality of interconnected components and each connection among the plurality of interconnected components, by identifying a set of attributes for each component from the one or more color images, wherein the set of attributes includes component color, cable color, cable interconnections, physical position, and the amount of space occupied by each component, and matching the identified set of attributes to a second set of attributes, the second set of attributes associated with a known component and stored in a database;
   determining, based on the matching, a specification for each component of the plurality of interconnected components; and
   generating, based on the determining, a document including the identity of each component of the plurality of interconnected components, a respective specification of each component of the plurality of interconnected components, and each connection among the plurality of interconnected components.

2. The method according to claim 1, wherein determining a specification for each component of the plurality of interconnected components further includes accessing an external database of computing components.

3. The method according to claim 1, wherein analyzing the one or more color images includes identifying the relative position of each component of the plurality of interconnected components in the computing environment.

4. The method according to claim 1, wherein the document includes building instructions for replicating the computing environment.

5. The method according to claim 1, wherein analyzing the one or more color images further comprises:
   determining a generic component type for each component of the plurality of interconnected components; and
   based on the generic component type, identifying a specific component type.

6. A system for generating a computer environment cloning document, the system comprising:
   a memory; and
   a processor in communication with the memory, wherein the computer system is configured to perform a method, the method comprising:
      receiving one or more images of a computing environment, the one or more color images depicting a plurality of interconnected components;
      analyzing the one or more color images to identify each component of the plurality of interconnected components and each connection among the plurality of interconnected components, by identifying a set of attributes for each component from the one or more color images, wherein the set of attributes includes component color, cable color, cable interconnections, physical position, and the amount of space occupied by each component, and matching the identified set of attributes to a second set of attributes, the second set of attributes associated with a known component and stored in a database;
      determining, based on the matching, a specification for each component of the plurality of interconnected components; and
      generating, based on the determining, a document including the identity of each component of the plurality of interconnected components, a respective specification of each component of the plurality of interconnected components, and each connection among the plurality of interconnected components.

7. The system according to claim 6, wherein determining a specification for each component of the plurality of interconnected components further includes accessing an external database of computing components.

8. The system according to claim 6, wherein analyzing the one or more color images includes identifying the relative position of each component of the plurality of interconnected components in the computing environment.

9. The system according to claim 6, wherein the document includes building instructions for replicating the computing environment.

10. The system according to claim 6, wherein analyzing the one or more color images further comprises:
    determining a generic component type for each component of the plurality of interconnected components; and
    based on the generic component type, identifying a specific component type.

11. A computer program product for generating a computer environment cloning document, the computer program product comprising a computer readable storage medium having program instructions embodied therewith, the program instructions executable by a device to cause the device to perform a method, the method comprising:
    receiving one or more images of a computing environment, the one or more color images depicting a plurality of interconnected components;

analyzing the one or more color images to identify each component of the plurality of interconnected components and each connection among the plurality of interconnected components, by identifying a set of attributes for each component from the one or more color images, wherein the set of attributes includes component color, cable color, cable interconnections, physical position, and the amount of space occupied by each component, and matching the identified set of attributes to a second set of attributes, the second set of attributes associated with a known component and stored in a database;

determining, based on the matching, a specification for each component of the plurality of interconnected components; and generating, based on the determining, a document including the identity of each component of the plurality of interconnected components, a respective specification of each component of the plurality of interconnected components, and each connection among the plurality of interconnected components.

12. The computer program product according to claim 11, wherein determining a specification for each component of the plurality of interconnected components further includes accessing an external database of computing components.

13. The computer program product according to claim 11, wherein analyzing the one or more color images includes identifying the relative position of each component of the plurality of interconnected components in the computing environment.

14. The computer program product according to claim 11, wherein the document includes building instructions for replicating the computing environment.

15. The computer program product according to claim 11, wherein analyzing the one or more color images further comprises:

determining a generic component type for each component of the plurality of interconnected components; and based on the generic component type, identifying a specific component type.

16. The method of claim 1, wherein analyzing the one or more color images to identify each component of the plurality of interconnected components includes receiving a set of logical attributes, including data from probes and sensors and management system data, and wherein the set of logical attributes is included in the set of identified attributes.

17. The method of claim 16, wherein matching the identified set of attributes to a second set of attributes further comprises:

determining the identified set of attributes and the second set of attributes do not match;

receiving, from an administrator, a confirmation to use the known component associated with the second set of attributes; and including the known component in the generated document.

18. The method of claim 17, wherein the generated document includes step-by-step instructions on how to build a replica of the computing environment.

19. The method of claim 18, further comprising:

building the replica of the computing environment;

generating a color image of the replica;

analyzing the color image of the replica;

determining, based on the analysis, the replica was built incorrectly;

in response to determining the replica was built incorrectly, displaying, to the administrator, a set of deviations and a set of suggestions for correcting the set of deviations.

20. The method of claim 19, wherein the set of suggestions further includes a set of suggestions for optimizing power and data cable connections.

\* \* \* \* \*